(12) United States Patent
Fukatsu et al.

(10) Patent No.: US 10,975,609 B2
(45) Date of Patent: Apr. 13, 2021

(54) VEHICLE DOOR APPARATUS

(71) Applicant: AISIN SEIKI KABUSHIKI KAISHA, Kariya (JP)

(72) Inventors: Daisuke Fukatsu, Okazaki (JP); Kiyokazu Ieda, Kariya (JP); Isao Honda, Kariya (JP); Ryu Miyashiro, Togo-cho (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 198 days.

(21) Appl. No.: 16/157,626

(22) Filed: Oct. 11, 2018

(65) Prior Publication Data

US 2019/0112862 A1 Apr. 18, 2019

(30) Foreign Application Priority Data

Oct. 13, 2017 (JP) .............................. JP2017-199203

(51) Int. Cl.
| | |
|---|---|
| *E05F 15/76* | (2015.01) |
| *E05F 15/73* | (2015.01) |
| *E05F 15/611* | (2015.01) |
| *E05F 15/77* | (2015.01) |
| *B60R 25/24* | (2013.01) |
| *B60J 5/04* | (2006.01) |

(52) U.S. Cl.
CPC .............. *E05F 15/76* (2015.01); *B60R 25/24* (2013.01); *E05F 15/611* (2015.01); *E05F 15/73* (2015.01); *E05F 15/77* (2015.01); *B60J 5/047* (2013.01); *E05Y 2900/531* (2013.01)

(58) Field of Classification Search
None
See application file for complete search history.

(56) References Cited

U.S. PATENT DOCUMENTS

2013/0169408 A1* 7/2013 Endo ................... B60R 25/01
340/5.6

FOREIGN PATENT DOCUMENTS

| JP | 2005-315024 | 11/2005 |
|---|---|---|
| JP | 2012-172367 | 9/2012 |
| JP | 2013-7171 | 1/2013 |

* cited by examiner

*Primary Examiner* — Kelly D Williams
(74) *Attorney, Agent, or Firm* — Oblon, McClelland, Maier & Neustadt, L.L.P.

(57) ABSTRACT

A vehicle door apparatus includes: an opening and closing drive device capable of opening and closing a swing door provided in a vehicle; and a control device configured to control the opening and closing drive device. The control device includes: an occupant detection unit configured to detect an occupant of the vehicle who approaches the door; a first opening operation control unit configured to open the door to a first opening degree when the occupant has entered an opening control area from a proximal end side of the door; and a second opening operation control unit configured to open the door from the first opening degree to a second opening degree when the occupant has moved to a free end side of the door beyond an opening operation trajectory of the door.

6 Claims, 5 Drawing Sheets

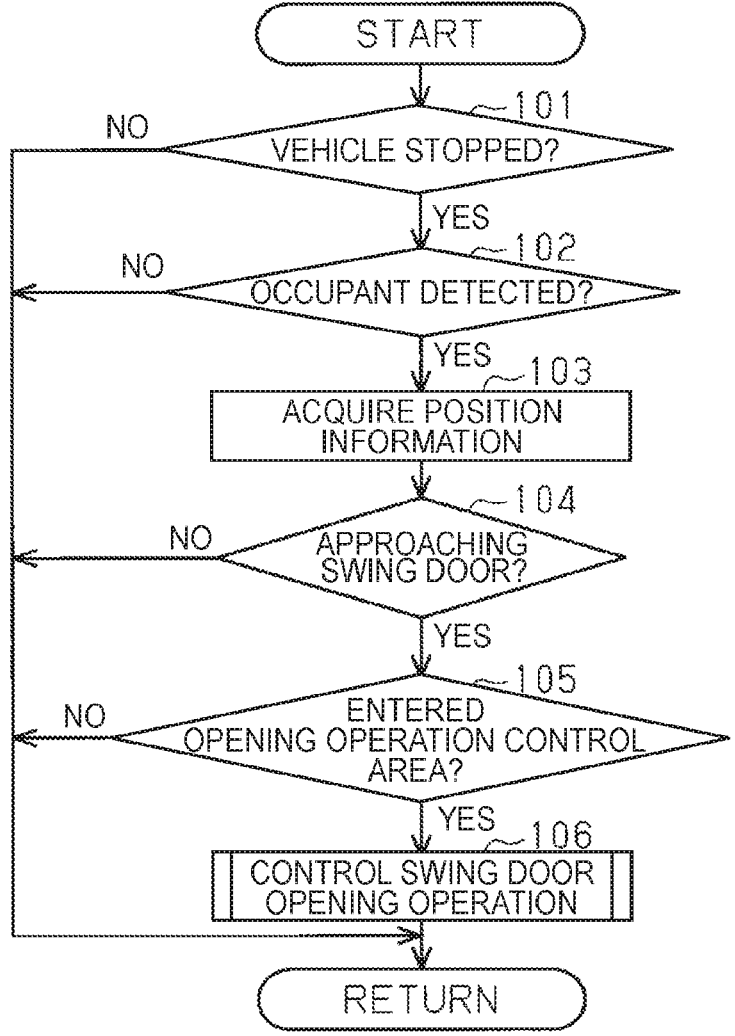
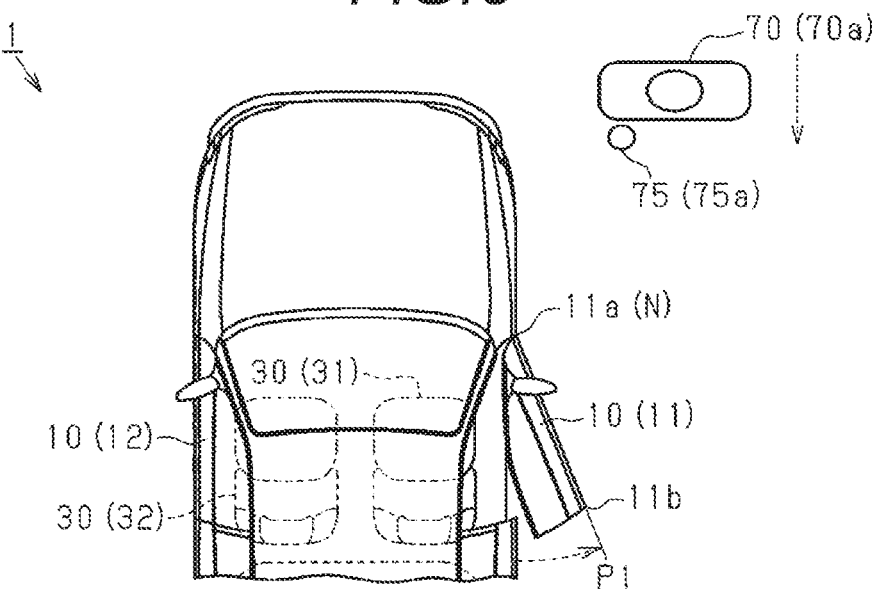

VEHICLE DOOR APPARATUS

CROSS REFERENCE TO RELATED APPLICATIONS

This application is based on and claims priority under 35 U.S.C. § 119 to Japanese Patent Application 2017-199203, filed on Oct. 13, 2017, the entire contents of which are incorporated herein by reference.

TECHNICAL FIELD

This disclosure relates to a vehicle door apparatus.

BACKGROUND DISCUSSION

In the related art, there is a vehicle door apparatus that detects an occupant who approaches a door of a vehicle to open the door. For example, JP 2005-315024 A (Reference 1) discloses a method of detecting an occupant who approaches a door of a vehicle by performing wireless communication with a portable device held by the occupant. In addition, in this example, a door to be opened is specified by detecting occupant's belongings. Then, when the specified door is a swing door, the opening operation timing of the swing door is determined according to the movement state of the occupant.

That is, when the occupant approaches from the proximal end side (vehicle front side) of the swing door provided with a rotation fulcrum of the swing door, the swing door that is opened may disturb the movement of the occupant (e.g., when another vehicle is parked nearby). Therefore, Reference 1 illustrates that it is desirable to open the swing door after the occupant moves to the free end side (vehicle rear side) of the swing door (see FIG. 7 in Reference 1).

However, the utility of the "door that is automatically opened" as described above has not only a practical aspect of not requiring an opening operation by the occupant but also an aspect as so-called "entertainment production." That is, the occupant of the vehicle obtains impression of "entertainment" represented by a keyword such as, for example, "welcome", "hospitable welcome", or "hospitality" when the door close to the occupant is automatically opened. However, in the above configuration of the related art, the door is not opened until the occupant passes by the side of the door to be opened. Therefore, since the entertainment impression may be diminished, there is a still room for improvement in this regard.

Thus, a need exists for a vehicle door apparatus which is not susceptible to the drawback mentioned above.

SUMMARY

A vehicle door apparatus according to an aspect of this disclosure includes: an opening and closing drive device capable of opening and closing a swing door provided in a vehicle; and a control device configured to control the opening and closing drive device, in which the control device includes: an occupant detection unit configured to detect an occupant of the vehicle who approaches the swing door; a first opening operation control unit configured to open the swing door to a first opening degree when it is detected that the occupant has entered an opening control area set around the swing door from a proximal end side of the swing door where a rotation fulcrum of the swing door is provided; and a second opening operation control unit configured to open the swing door from the first opening degree to a second opening degree that is greater than the first opening degree when it is detected that the occupant who has entered the opening control area from the proximal end side of the swing door has moved to a free end side of the swing door beyond an opening operation trajectory of the swing door.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a flowchart illustrating a processing procedure of detecting the occupant who approaches the swing door and controlling an opening operation of the swing door;

FIG. 6 is an explanatory view illustrating an opening operation control mode when the occupant has entered the opening control area from the vehicle front side (at the time of entry);

DETAILED DESCRIPTION

Hereinafter, an embodiment of a vehicle door apparatus will be described with reference to the accompanying drawings.

Figure 1:
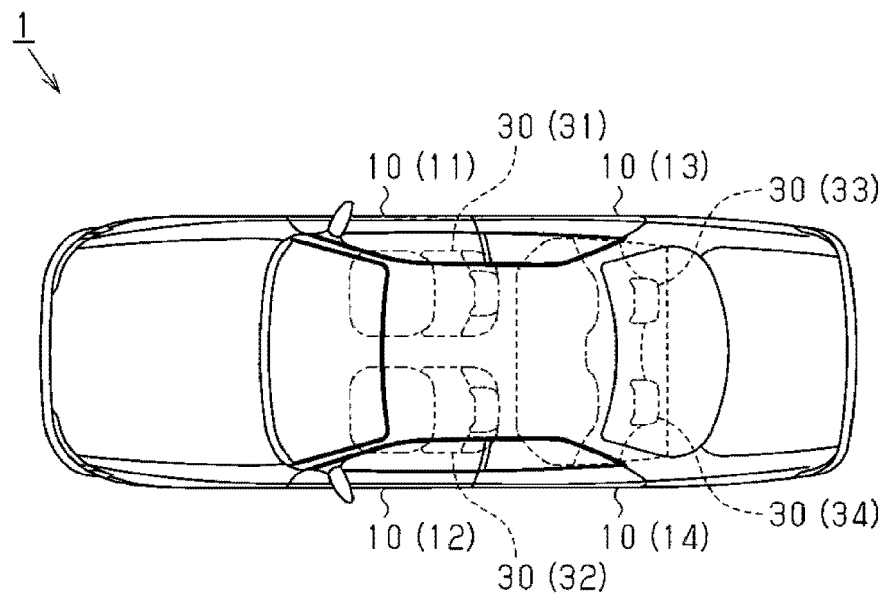
FIG. 1 is a plan view of a vehicle having a swing door.
Figure 2:
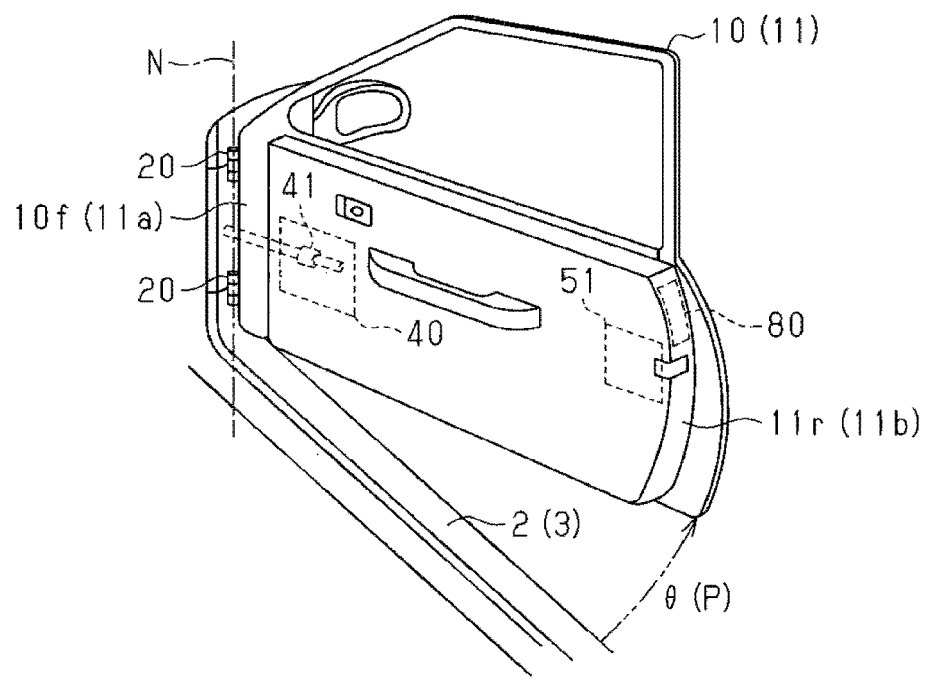
FIG. 2 is a perspective view of the swing door provided with an opening and closing drive device.

As illustrated in FIGS. 1 and 2, a vehicle 1 of the present embodiment is a so-called 4-door sedan having four swing doors 10 (11 to 14) each of which opens and closes a door opening 3 provided in the side surface of a vehicle body 2. Specifically, in the vehicle 1 of the present embodiment, each swing door 10 is supported on the vehicle body 2 via a hinge 20 provided on the front end portion 10f side thereof. In addition, each swing door 10 rotates around the hinge 20 as a fulcrum (rotation fulcrum N). Then, the vehicle 1 of the present embodiment is configured such that each swing door 10 is opened and closed at the lateral side of a corresponding seat 30 (31 to 34) provided in a cabin of the vehicle 1.

Figure 3:
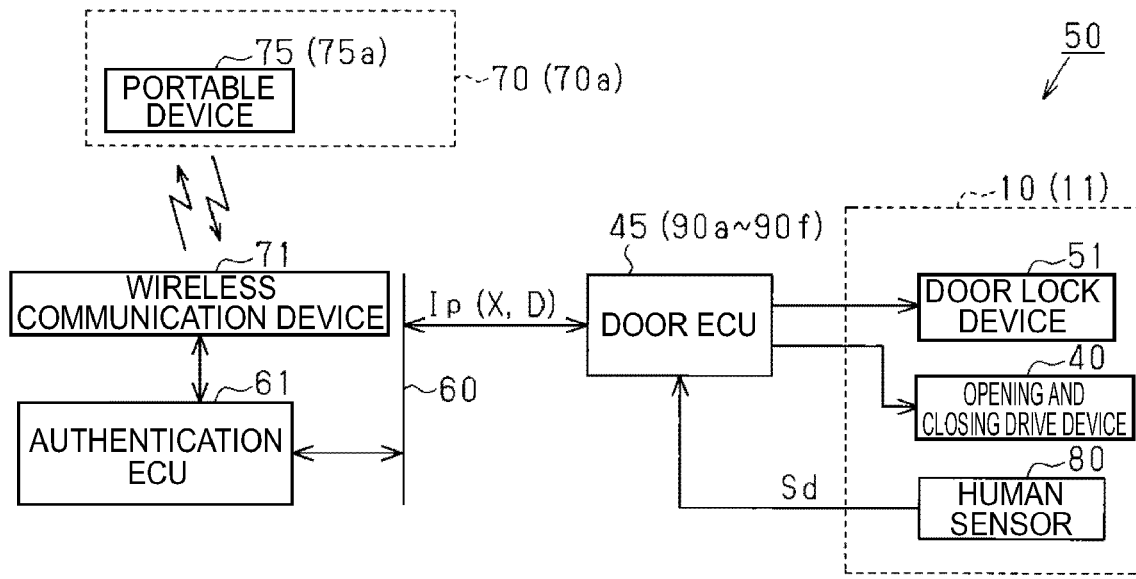
FIG. 3 is a schematic view of a configuration of a vehicle door apparatus.

In addition, as illustrated in FIGS. 2 and 3, in the vehicle 1 of the present embodiment, the swing door 11 provided at the lateral side of a driver's seat 31 (see FIG. 1) is provided with an opening and closing drive device 40 which is capable of opening and closing the swing door 11 using a motor (not illustrated) as a drive source. Specifically, the opening and closing drive device 40 of the present embodiment is integrally provided with a check mechanism 41 which is capable of holding the swing door 11 at an arbitrary opening degree P (operating angle θ). In addition, an operation of the opening and closing drive device 40 is controlled by a door ECU 45, which is a control device. Then, the vehicle 1 of the present embodiment is formed with a door apparatus 50 which is capable of automatically opening and closing the swing door 11.

Specifically, the door ECU 45 of the present embodiment controls an operation of a door lock device 51 provided in each swing door 10. That is, the door ECU 45 opens the door lock device 51 provided in each swing door 10 under the condition that security requirements of the vehicle 1 are satisfied. Therefore, the door ECU 45 of the present embodiment executes the opening and closing control of the swing door 11 provided with the opening and closing drive device 40 in a state where restraint on each swing door 10 by the door lock device 51 is released.

Figure 4:
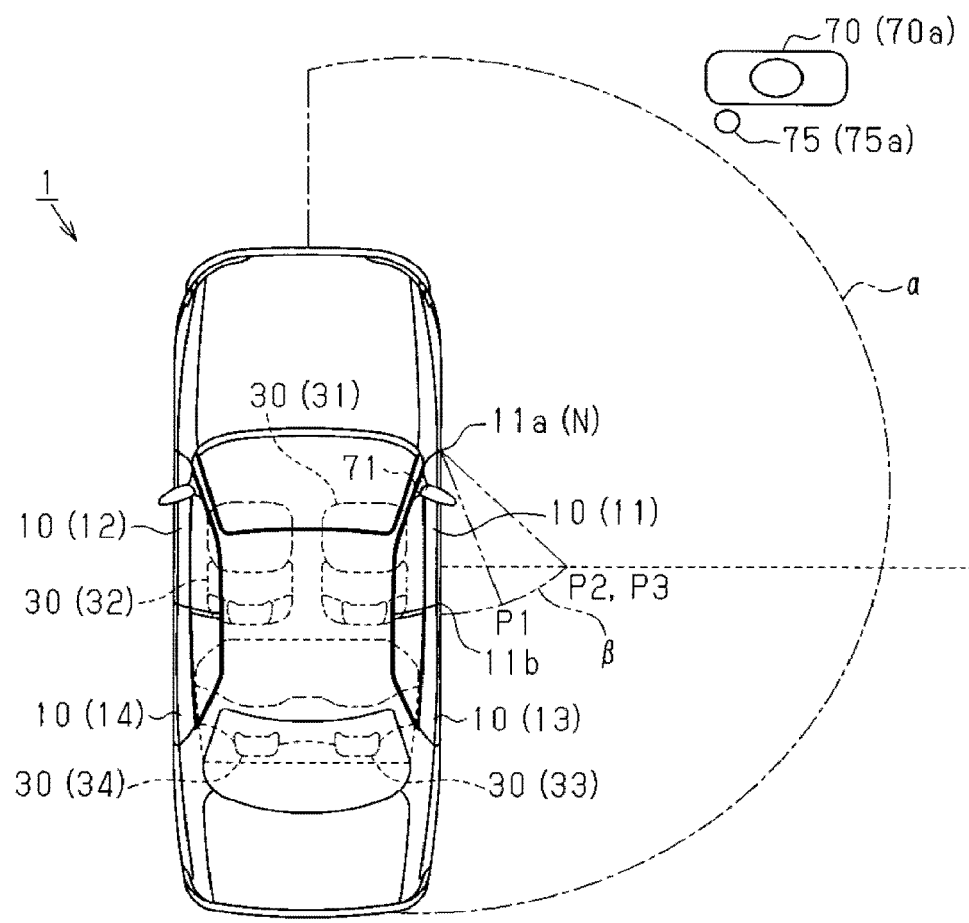
FIG. 4 is an explanatory view illustrating an opening control area set around the swing door and an occupant who approaches the swing door.

More specifically, as illustrated in FIGS. 3 and 4, the door ECU 45 of the present embodiment detects an authorized occupant 70a who has the authority to operate the vehicle 1 including the swing door 11 by communicating with an authentication ECU 61 via an in-vehicle network 60. Specifically, the authentication ECU 61 of the present embodiment determines whether or not a portable device 75 located in the vicinity of the vehicle 1 is an authorized portable device 75a paired with the vehicle 1 by performing wireless communication with the portable device 75 via a wireless communication device (e.g., antenna) 71 provided in the vehicle 1. That is, in the vehicle 1 of the present embodiment, a person who possesses the authorized portable device 75a is authenticated as the authorized occupant 70a who has the authority to operate the vehicle 1. Then, when the authorized occupant 70a is detected, the door ECU 45 of the present embodiment permits an opening operation of the swing door 11 by the opening and closing drive device 40.

In addition, the door ECU 45 of the present embodiment acquires position information Ip of the authorized occupant 70a (hereinafter simply referred to as the occupant 70 of the vehicle 1) who holds the authorized portable device 75a via communication with the authentication ECU 61. Specifically, the position information Ip includes the movement position X and the movement direction D of the occupant 70. In addition, in the vehicle 1 of the present embodiment, an opening control area α is set around the swing door 11, and the door ECU 45 of the present embodiment determines whether or not the occupant 70 of the vehicle 1 is located in the opening control area α based on the acquired position information Ip. Then, when detecting the occupant 70 who has entered the opening control area α, the door ECU 45 controls an operation of the opening and closing drive device 40 to open the swing door 11.

That is, as illustrated in the flowchart of FIG. 5, when the vehicle 1 is in a stop state (step 101: YES) and when the occupant 70 (70a) is detected around the vehicle 1 (step 102: YES), the door ECU 45 of the present embodiment acquires position information of the occupant 70 (step 103). In addition, the door ECU 45 determines whether or not the occupant 70 is approaching the swing door 11 provided with the opening and closing drive device 40 (step 104), and when the occupant 70 which is approaching the swing door 11 is detected (step 104: YES), the door ECU 45 determines whether or not the occupant 70 is entering the opening control area α of the swing door 11 (step 105). Then, when detecting that the occupant 70 is entering the opening control area α (step 105: YES), the door ECU 45 of the present embodiment executes the opening operation control of the swing door 11 (step 106).

More specifically, as illustrated in FIG. 6, when the occupant 70 has entered the opening control area α from the vehicle front side (upper side in FIG. 6), i.e., when the occupant 70 is approaching the swing door 11 from a proximal end 11a side (see FIG. 2) of the swing door 11 at which the rotation fulcrum N is provided, the door ECU 45 of the present embodiment opens the swing door 11 to a first opening degree P1.

Figure 7:
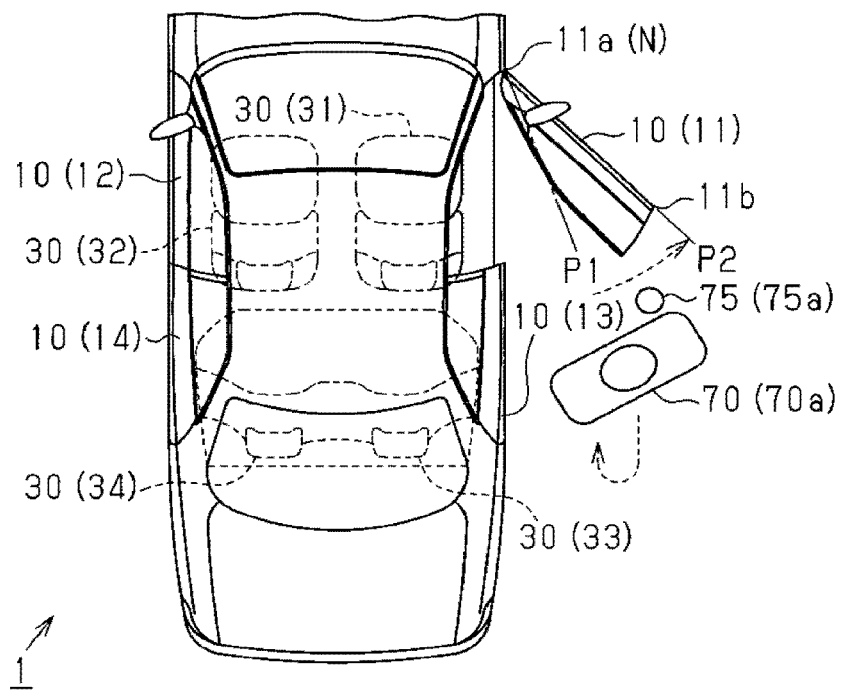
FIG. 7 is an explanatory view illustrating an opening operation control mode when the occupant has entered the opening control area from the vehicle front side (after rearward movement)

In addition, as illustrated in FIG. 7, the door ECU 45 of the present embodiment detects that the occupant 70 who approaches from the vehicle front side has moved to the vehicle rear side, i.e., to a free end 11b side (see FIG. 2) of the swing door 11 which moves outward in the vehicle width direction (right side in FIG. 7) by the opening operation thereof beyond an opening operation trajectory β (see FIG. 4) of the swing door 11. Then, based on the detection of the movement of the occupant 70 beyond the opening operation trajectory β of the swing door 11, the door ECU 45 opens the swing door 11 from the first opening degree P1 to a second opening degree P2 which is greater than the first opening degree P1.

Specifically, in the vehicle 1 of the present embodiment, the first opening degree P1 is an opening degree P, e.g., the operating angle θ (see FIG. 2) that corresponds to a so-called "pop-up" of the swing door 11 and is set to about 20°. Then, the second opening degree P2 is an opening degree P, e.g., the operating angle θ at which the occupant 70 easily gets in the vehicle 1 through the door opening 3 provided with the swing door 11 and is set to about 45°.

That is, when the occupant 70 is approaching the swing door 11 from the vehicle front side, the door apparatus 50 of the present embodiment opens the swing door 11 to the first opening degree P1 at which the operating angle θ of the swing door 11 is suppressed. Thus, when the occupant 70 passes through the side of the swing door 11 and moves to the vehicle rear side, the swing door 11 that is opened does not disturb the movement of the occupant 70.

In addition, even in a state where the operating angle θ is suppressed as described above, it is possible to ensure "entertainment impression" given to the occupant 70 when the swing door 11 is promptly opened in response to the approach of the occupant 70. In addition, when the swing door 11 is opened to the greater second opening degree P2 after the occupant 70 has turned around to the rear side of the swing door 11, it is possible to ensure a practical function of not requiring an opening operation by the occupant 70. Thus, with the door apparatus 50 of the present embodiment, it is possible to produce higher quality "entertainment impression" when the occupant 70 notices the meaning of the "suppressed" first opening degree P1, in conclusion, for example, that the occupant can easily pass by the swing door 11 even in a case where there is an obstacle (e.g., another vehicle or wall) next to the vehicle 1.

Specifically, as illustrated in FIGS. 2 and 3, in the vehicle 1 of the present embodiment, a human sensor 80 is provided on a rear end portion 11r of the swing door 11 which is the free end 11b of the swing door 11. Then, the door ECU 45 of the present embodiment detects the occupant 70 who has moved to the free end 11b side of the swing door 11 beyond the opening operation trajectory β of the swing door 11 based on a sensor output Sd from the human sensor 80.

In addition, a proximity sensor such as, for example, a capacitance type, infrared type, or radio-wave type sensor is used for the human sensor 80 of the present embodiment. Then, the human sensor 80 is provided at a position at which it is exposed to the outside of the vehicle 1 in a state where the swing door 11 is opened.

Figure 8:
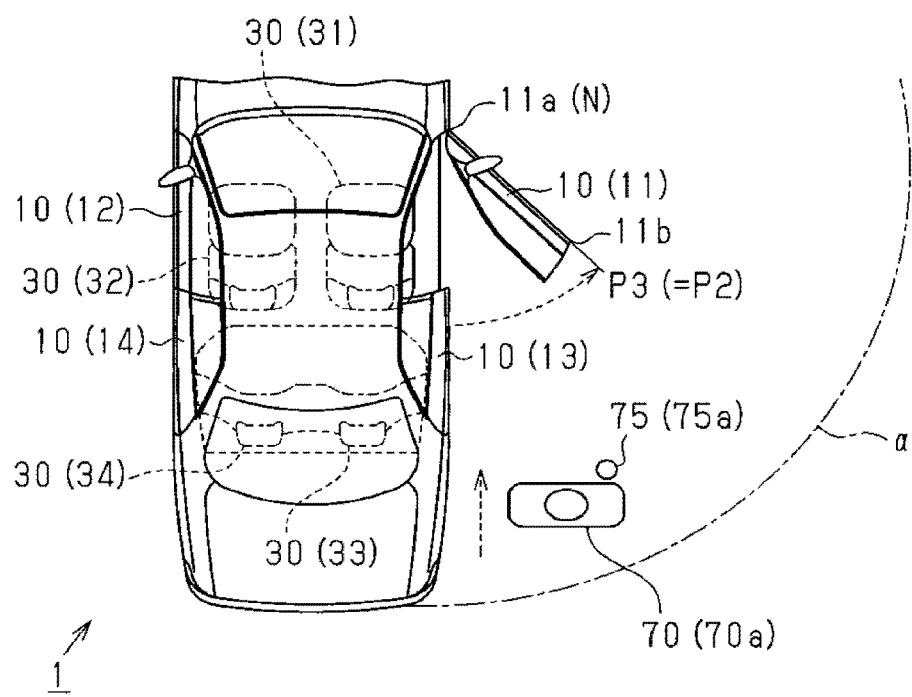
FIG. 8 is an explanatory view illustrating an opening operation control mode when the occupant has entered the opening control area from the vehicle rear side.

In addition, as illustrated in FIG. 8, when the occupant 70 has entered the opening control area α from the vehicle rear side (lower side in FIG. 8), i.e., when the occupant 70 is approaching the swing door 11 from the free end 11b side of the swing door 11, the door ECU 45 of the present embodiment opens the swing door 11 to a third opening degree P3. In addition, in the vehicle 1 of the present embodiment, the same operating angle θ as the second opening degree P2 is set to the third opening degree P3. Thus, the door apparatus 50 of the present embodiment enables the occupant 70 who has approached the swing door 11 from the vehicle rear side to promptly get in the vehicle 1 through the door opening 3 provided with the swing door 11.

Figure 9:
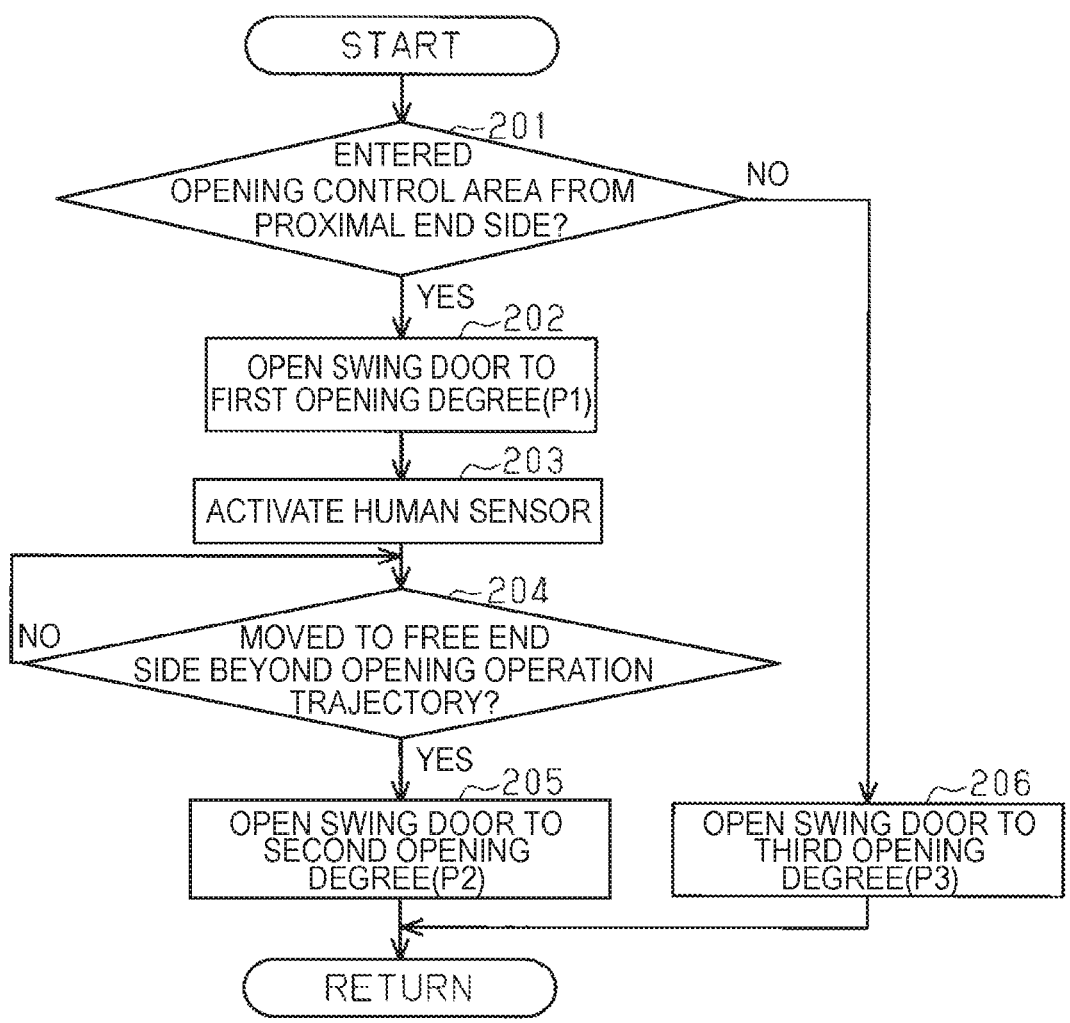
FIG. 9 is a flowchart illustrating a processing procedure of opening operation control.

That is, as illustrated in the flowchart of FIG. 9, in the opening operation control of the swing door 11 (see FIG. 5, step 106), the door ECU 45 of the present embodiment first determines whether or not the occupant 70 has entered the opening control area a set around the swing door 11 from the vehicle front side which is the proximal end 11a side of the swing door 11 (step 201). Then, when it is detected that the occupant 70 has entered the opening control area α from the vehicle front side (step 201: YES), the door ECU 45 opens the swing door 11 to the first opening degree P1 (step 202).

In addition, the door ECU 45 activates the human sensor 80 provided on the rear end portion 11r of the swing door 11 (step 203), and determines whether or not the occupant 70 who has entered the opening control area α from the vehicle front side has moved to the vehicle rear side which is the free end 11b side of the swing door 11 beyond the opening operation trajectory β of the swing door 11 (step 204). Then, when the movement of the occupant 70 beyond the opening operation trajectory β of the swing door 11 is detected (step 204: YES), the door ECU 45 opens the swing door 11 from the first opening degree P1 to the second opening degree P2.

In addition, in step 201, when a direction in which the occupant 70 enters the opening control area α is not the vehicle front side (step 201: NO), the door ECU 45 of the present embodiment determines that the occupant 70 has entered the opening control area α from the vehicle rear side which is the free end 11b side of the swing door 11. Then, when the occupant 70 who has entered the opening control area α from the vehicle rear side is detected as described above, the door ECU 45 opens the swing door 11 to the third opening degree P3 at once (step 206).

As described above, according to the present embodiment, the following effects may be obtained.

(1) The door ECU 45 as an occupant detection unit 90a detects the occupant 70 who approaches the swing door 11 provided in the vehicle 1. In addition, the door ECU 45 as a first opening operation control unit 90b opens the swing door 11 to the first opening degree P1 when it is detected that the occupant 70 has entered the opening control area α set around the swing door 11 from the proximal end 11a side (vehicle front side) of the swing door 11 provided with the rotation fulcrum N. In addition, the door ECU 45 as a second opening operation control unit 90c detects that the occupant 70 who has entered the opening control area α from the proximal end 11a side of the swing door 11 has moved to the free end 11b side (vehicle rear side) of the swing door 11 beyond the opening operation trajectory β of the swing door 11. Then, the door ECU 45 opens the swing door 11 from the first opening degree P1 to the second opening degree P2 which is greater than the first opening degree P1 based on the detection of the movement of the occupant 70 beyond the opening operation trajectory β of the swing door 11.

That is, by opening the swing door 11 to the first opening degree P1 at which the operating angle θ is suppressed, when the occupant approaches the swing door 11 from the proximal end 11a side (vehicle front side) provided with the rotation fulcrum N and passes through the side of the swing door 11, it is possible to prevent the swing door 11 that is opened from disturbing the movement of the occupant 70.

In addition, even in a state where the operating angle θ is suppressed as described above, it is possible to ensure "entertainment impression" given to the occupant 70 when the swing door 11 is promptly opened in response to the approach of the occupant 70. In addition, when the swing door 11 is opened to the greater second opening degree P2 after the occupant 70 has turned around to the free end 11b side (vehicle rear side) of the swing door 11, it is possible to ensure a practical function of not requiring an opening operation by the occupant 70. Therefore, it is possible to produce higher quality "entertainment impression" when the occupant 70 notices the meaning of the "suppressed" first opening degree P1, in conclusion, for example, that the occupant can easily pass by the swing door 11 even in a case where there is an obstacle (e.g., another vehicle or wall) next to the vehicle 1.

(2) The door ECU 45 as a third opening operation control unit 90d opens the swing door to the third opening degree P3 which is greater than the first opening degree P1 when detecting that the occupant 70 has entered the opening control area α from the free end 11b side (vehicle rear side) of the swing door 11.

That is, when the occupant 70 approaches the swing door 11 from the free end 11b side of the swing door 11, the opening operation of the swing door 11 does not disturb the movement of the occupant 70. Thus, according to the above configuration, the occupant 70 who has approached the swing door 11 from the free end 11b side may promptly get in the vehicle 1 through the door opening 3 provided with the swing door 11. In addition, by comparison with control content (P1→P2, two-stage opening operation) when the occupant 70 has approached the swing door 11 from the proximal end 11a side of the swing door 11, the occupant 70 is more likely to notice the meaning of the "suppressed" first opening degree P1 when the occupant 70 has approached the swing door 11 from the proximal end 11a side of the swing door 11. Therefore, it is possible to more effectively produce higher quality "entertainment impression."

(3) The door ECU 45 detects that the occupant 70 has moved to the free end 11b side of the swing door 11 beyond the opening operation trajectory β of the swing door 11 based on the sensor output Sd from the human sensor 80 provided on the free end 11b (the rear end portion 11r) of the swing door 11.

According to the above configuration, it is possible to accurately detect the occupant 70 who has passed through the side of the swing door 11 and turned around to the free end 11b side of the swing door 11 (the vehicle rear side). Therefore, it is possible to open the swing door 11 from the first opening degree P1 to the second opening degree P2 at a more appropriate timing.

(4) The human sensor 80 is activated after the swing door 11 is opened to the first opening P1. Therefore, it is possible to suppress occurrence of erroneous detection and more accurately detect the occupant 70 who has passed through the side of the swing door 11 and turned around to the free end 11b side of the swing door 11.

(5) The door ECU 45 as an occupant authentication unit 90e detects the authorized occupant 70a who has the authority to operate the vehicle 1 including the swing door 11 by communicating with the authentication ECU 61. Then, the door ECU 45 as an opening operation permission unit 90f permits the opening operation of the swing door 11 when the authorized occupant 70a approaches the swing door 11. Therefore, it is possible to ensure high security performance.

(6) The authentication ECU 61 which constitutes the occupant authentication unit 90e via communication with the door ECU 45 determines whether or not the occupant 70 is the authorized occupant 70a who has the operation authority by performing wireless communication with the portable device 75 (75a) held by the occupant 70 of the vehicle 1. Therefore, it is possible to correctly detect the authorized occupant 70a who has the operation authority using a wireless authentication system of the vehicle 1.

In addition, the above embodiment may be modified as follows.

In the above embodiment, the opening and closing drive device 40 is provided in the swing door 11 provided at the lateral side of the driver's seat 31. Then, the opening operation control in a case where the occupant 70 has approached the swing door 11 is executed with respect to the swing door 11. However, this disclosure is not limited thereto, and the same opening operation control as in the above embodiment may be performed with respect to the swing door 12 provided at the lateral side of a passenger seat 32. Then, the same opening operation control as in the above embodiment may be performed with respect to each of the swing doors 13 and 14 provided at the lateral side of rear seats 33 and 34.

In the above embodiment, each swing door 10 (11 to 14) is opened and closed about the hinge 20 provided on the front end portion 10f thereof as the rotation fulcrum N, but this disclosure may be applied to, for example, the opening operation control of a swing door provided with a rotation fulcrum N at the vehicle rear side such as, for example, a vehicle that adopts a so-called "double hinge door method". Then, when a swing door is used as a back door that opens and closes the rear end portion of the vehicle, the same opening operation control as in the above embodiment may be performed with respect to the back door.

In the above embodiment, the authentication ECU 61 determines whether or not the occupant 70 is the authorized occupant 70a who has the authority to operate the vehicle 1 including the swing door 11 by performing wireless communication with the portable device 75 (75a) held by the occupant 70 of the vehicle 1. However, this disclosure is not limited thereto, and for example, a method of authenticating the authorized occupant 70a may be arbitrarily changed to, for example, a face authentication method based on image analysis using a camera. Then, instead of the authority to operate the entire vehicle 1, the operation authority may be set for each swing door which is an opening operation control target.

In the above embodiment, the same operation angle θ as the second opening degree P2 is set to the third opening degree P3, but different operating angles θ may be set to the second and third opening degrees P2 and P3. Then, the setting range of the opening control area α may vary according to the movement direction of the occupant 70 who approaches the swing door 11.

In the above embodiment, the opening and closing drive device 40 opens and closes the swing door 11 using the motor as a drive source, but the drive source may be arbitrarily changed, and for example, an elastic member such as, for example, a spring may be used. Then, a closing operation may be manually performed by the occupant 70 as long as the same opening operation control as in the above embodiment may be executed.

A vehicle door apparatus according to an aspect of this disclosure includes: an opening and closing drive device capable of opening and closing a swing door provided in a vehicle; and a control device configured to control the opening and closing drive device, in which the control device includes: an occupant detection unit configured to detect an occupant of the vehicle who approaches the swing door; a first opening operation control unit configured to open the swing door to a first opening degree when it is detected that the occupant has entered an opening control area set around the swing door from a proximal end side of the swing door where a rotation fulcrum of the swing door is provided; and a second opening operation control unit configured to open the swing door from the first opening degree to a second opening degree that is greater than the first opening degree when it is detected that the occupant who has entered the opening control area from the proximal end side of the swing door has moved to a free end side of the swing door beyond an opening operation trajectory of the swing door.

That is, by opening the swing door to the first opening degree at which an operating angle is suppressed, it is possible to prevent the swing door that is opened from disturbing movement of the occupant when the occupant approaches the swing door from the proximal end side provided with the rotation fulcrum and passes through the side of the swing door.

In addition, even in a state where the operating angle is suppressed as described above, it is possible to ensure "entertainment impression" given to the occupant when the swing door is promptly opened in response to the approach of the occupant. In addition, since the swing door is opened to the greater second opening degree after the occupant has turned around to the free end side of the swing door, it is possible to ensure a practical function of not requiring an opening operation by the occupant. Therefore, it is possible to produce higher quality "entertainment impression" when the occupant notices the meaning of the "suppressed" first opening degree, in conclusion, for example, that the occupant can easily pass by the swing door even in a case where there is an obstacle (e.g., another vehicle or wall) next to the vehicle.

In the vehicle door apparatus according to the aspect of this disclosure, it is preferable that the control device further includes a third opening operation control unit configured to open the swing door to a third opening degree that is greater than the first opening degree when it is detected that the occupant has entered the opening control area from the free end side of the swing door.

That is, when the occupant approaches the swing door from the free end side of the swing door, the opening operation of the swing door does not disturb the movement of the occupant. Thus, according to the above configuration, the occupant who approaches the swing door from the free end side may promptly get in the vehicle through a door opening provided with the swing door. In addition, by comparison with control content (two-stage opening operation) when the occupant has approached the swing door from the proximal end side of the swing door, the occupant is more likely to notice the meaning of the "suppressed" first opening degree when the occupant has approached the swing door from the proximal end side of the swing door thereof. Therefore, it is possible to more effectively produce higher quality "entertainment impression."

In the vehicle door apparatus according to the aspect of this disclosure, it is preferable that the occupant detection unit detects that the occupant has moved to the free end side of the swing door beyond the opening operation trajectory of the swing door based on a sensor output from a human sensor provided on a free end of the swing door.

According to the above configuration, it is possible to accurately detect the occupant who has passed through the side of the swing door and turned around to the free end side of the swing door. Therefore, it is possible to open the swing door from the first opening degree to the second opening degree at a more appropriate timing.

In the vehicle door apparatus according to the aspect of this disclosure, it is preferable that the human sensor is activated after the swing door is opened to the first opening degree.

According to the above configuration, it is possible to suppress occurrence of erroneous detection and more accurately detect the occupant who has passed through the side of the swing door and turned around to the free end side of the swing door.

In the vehicle door apparatus according to the aspect of this disclosure, it is preferable that the occupant detection unit includes an occupant authentication unit configured to detect an authorized occupant who has an authority to operate the swing door, and an opening operation permission unit configured to permit an opening operation of the swing door when the authorized occupant approaches the swing door.

According to the above configuration, it is possible to secure high security performance.

In the vehicle door apparatus according to the aspect of this disclosure, it is preferable that the occupant authentication unit determines whether or not the occupant is the authorized occupant by performing wireless communication with a portable device held by the occupant.

According to the above configuration, it is possible to accurately detect an authorized occupant who has the authority to operate a vehicle by using a wireless authentication system mounted in many vehicles.

According to the aspect of this disclosure, it is possible to produce higher quality entertainment impression.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door apparatus comprising:
an opening and closing drive device configured to open and close a swing door provided in a vehicle; and
an electronic control unit configured to control the opening and closing drive device, the electronic control unit including:
an occupant detection unit configured to detect an occupant of the vehicle who approaches the swing door;
a first opening operation control unit configured to open the swing door to a first opening degree when it is detected that the occupant has entered an opening control area set around the swing door from a proximal end side of the swing door where a rotation fulcrum of the swing door is provided; and
a second opening operation control unit configured to open the swing door from the first opening degree to a second opening degree that is greater than the first opening degree when it is detected that the occupant who has entered the opening control area from the proximal end side of the swing door has moved to a free end side of the swing door beyond an opening operation trajectory of the swing door,
wherein the swing door is arranged in a front-rear direction of the vehicle when closed and the proximal end side of the swing door is closer to a front end of the vehicle than the free end side.

2. The vehicle door apparatus according to claim 1, wherein the occupant detection unit detects that the occupant has moved to the free end side of the swing door beyond the opening operation trajectory of the swing door based on a sensor output from a human sensor provided on a free end of the swing door.

3. The vehicle door apparatus according to claim 2, wherein the human sensor is activated after the swing door is opened to the first opening degree.

4. The vehicle door apparatus according to claim 1, wherein the occupant detection unit includes:
an occupant authentication unit configured to detect an authorized occupant who has an authority to operate the swing door; and
an opening operation permission unit configured to permit an opening operation of the swing door when the authorized occupant approaches the swing door.

5. The vehicle door apparatus according to claim 4, wherein the occupant authentication unit determines whether or not the occupant is the authorized occupant by performing wireless communication with a portable device held by the occupant.

6. A vehicle door apparatus comprising:
an opening and closing drive device configured to open and close a swing door provided in a vehicle; and
an electronic control unit configured to control the opening and closing drive device, the electronic control unit including:
an occupant detection unit configured to detect an occupant of the vehicle who approaches the swing door;
a first opening operation control unit configured to open the swing door to a first opening degree when it is detected that the occupant has entered an opening control area set around the swing door from a proximal end side of the swing door where a rotation fulcrum of the swing door is provided;
a second opening operation control unit configured to open the swing door from the first opening degree to a second opening degree that is greater than the first opening degree when it is detected that the occupant who has entered the opening control area from the proximal end side of the swing door has moved to a free end side of the swing door beyond an opening operation trajectory of the swing door; and
a third opening operation control unit configured to open the swing door to a third opening degree that is greater than the first opening degree when it is detected that the occupant has entered the opening control area from the free end side of the swing door.

* * * * *